May 13, 1924.

J. C. STEVENS

WATER LEVEL RECORDER

Filed April 10, 1922

INVENTOR.
J.C. Stevens.
BY Goldberg
ATTORNEY.

May 13, 1924.

J. C. STEVENS

WATER LEVEL RECORDER

Filed April 10, 1922    5 Sheets-Sheet 3

1,494,034

INVENTOR.
J. C. Stevens.
BY Goldberg,
ATTORNEY.

May 13, 1924.
J. C. STEVENS
1,494,034
WATER LEVEL RECORDER
Filed April 10, 1922          5 Sheets-Sheet 4
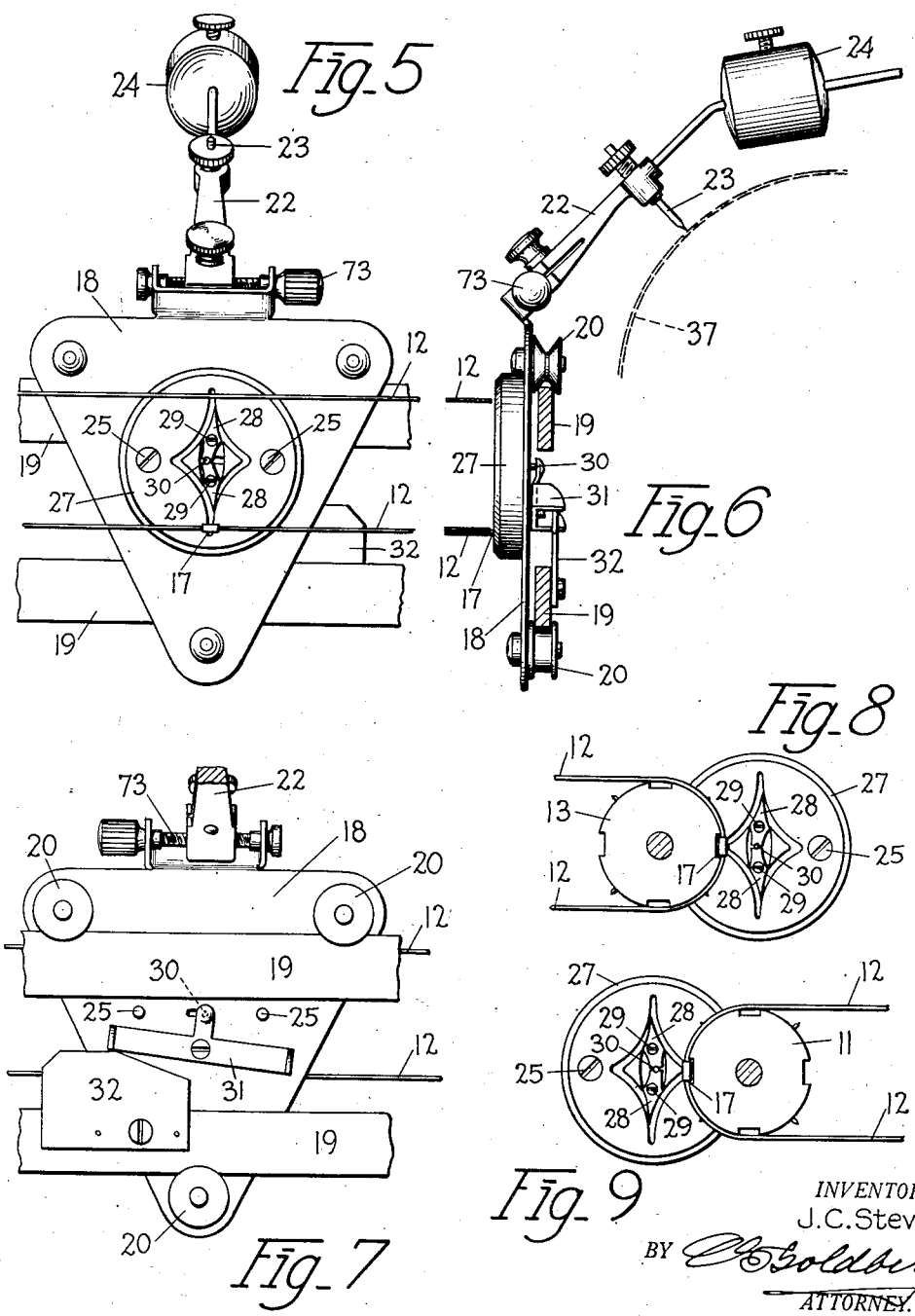
INVENTOR.
J.C. Stevens
BY Goldberg
ATTORNEY.

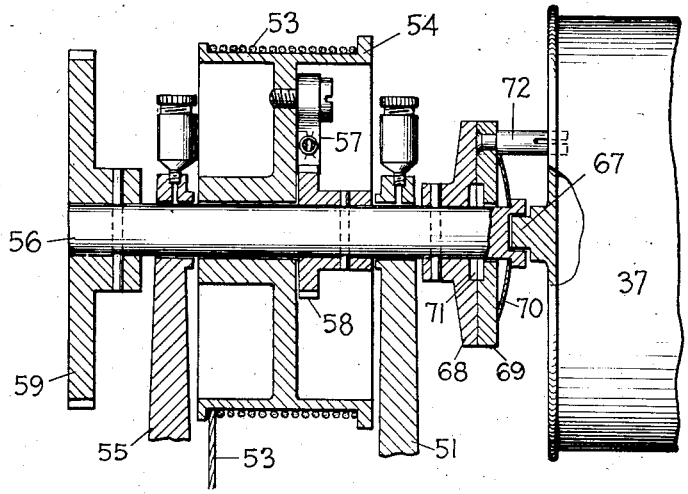
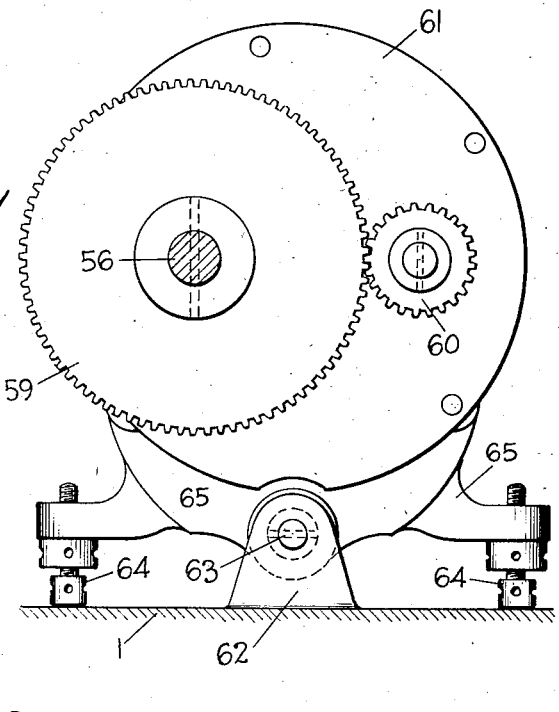
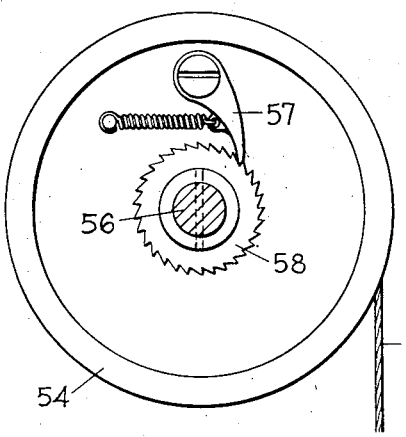

Patented May 13, 1924.

1,494,034

UNITED STATES PATENT OFFICE.

JOHN C. STEVENS, OF PORTLAND, OREGON.

WATER-LEVEL RECORDER.

Application filed April 10, 1922. Serial No. 551,184.

*To all whom it may concern:*

Be it known that I, JOHN C. STEVENS, a citizen of the United States, residing at Portland, in the county of Multnomah and State of Oregon, have invented a new and useful Water-Level Recorder, of which the following is a specification.

My invention relates to improvements in water level recorders in which a float-operated recording pencil operates in conjunction with a strip of paper actuated by a time-controlled drum.

The general objects of my invention are to produce a mechanism which: will record the variations in the height of water levels in oceans, lakes, rivers, reservoirs and tanks; will give a continuous record over a considerable period of time; will not be affected in its accuracy by the severe and trying conditions encountered in the field; can be entrusted for successful operation to attendants with limited mechanical training.

Some special objects are: to make the reversing motion of the pencil carriage accurate and positive; to support the perforated metal belt yieldingly at one end; to make the connection between the timing device and recording drum flexible and adjustable; to provide for quick exchange and accurate alinement of the regulating clock; to furnish the supply roller with an improved braking device; to provide the take-up roller with means to counteract uneven tension in the record paper; and to eliminate lost motion wherever possible.

Further objects and advantages are to be found in the construction and arrangements of parts as will be described in the specifications hereinafter, and particularly pointed out in the appended claims.

I attain these objects with the mechanism illustrated in the accompanying drawings, in which:—

Fig. 5 is a front elevation of the recording carriage on an enlarged scale.

Fig. 6 is a side view of Fig. 5.

Fig. 7 is a rear view of Fig. 5.

Fig. 8 shows that portion of the recording carriage, called the cycloidal cam, having arrived at the extreme end of its travel toward the right.

Fig. 9 shows the cycloidal cam at the extreme end of the travel toward the left.

Fig. 10 is a vertical longitudinal section through the cable drum.

Fig. 11 is an elevation of the regulating clock as seen from the line 11—11 in Fig. 1.

Fig. 12 illustrates the ratchet mechanism in the cable drum.

Similar numerals refer to similar parts throughout the several views.

Figure 1:
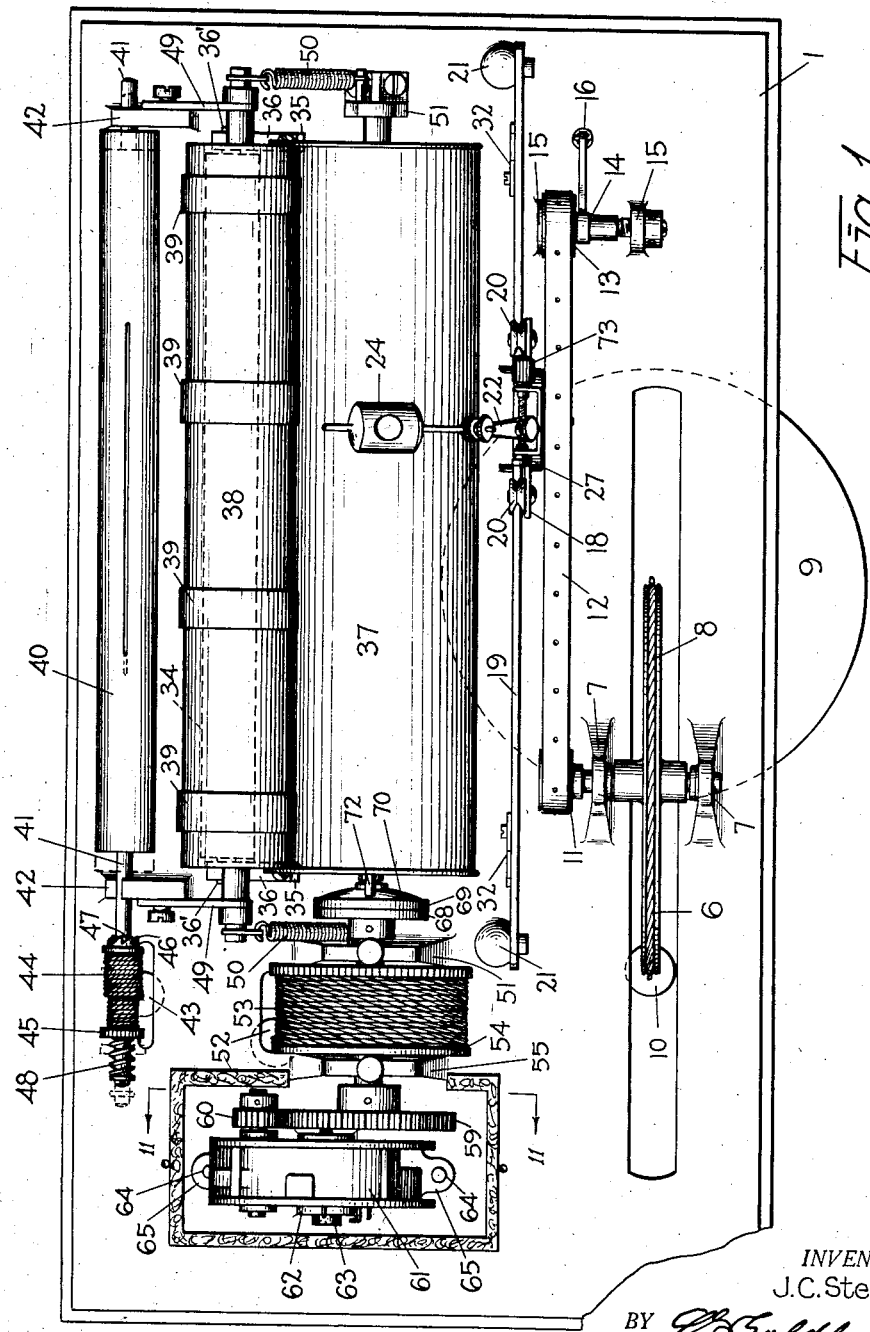
Fig. 1 is a plan view of the entire apparatus.
Figure 2:
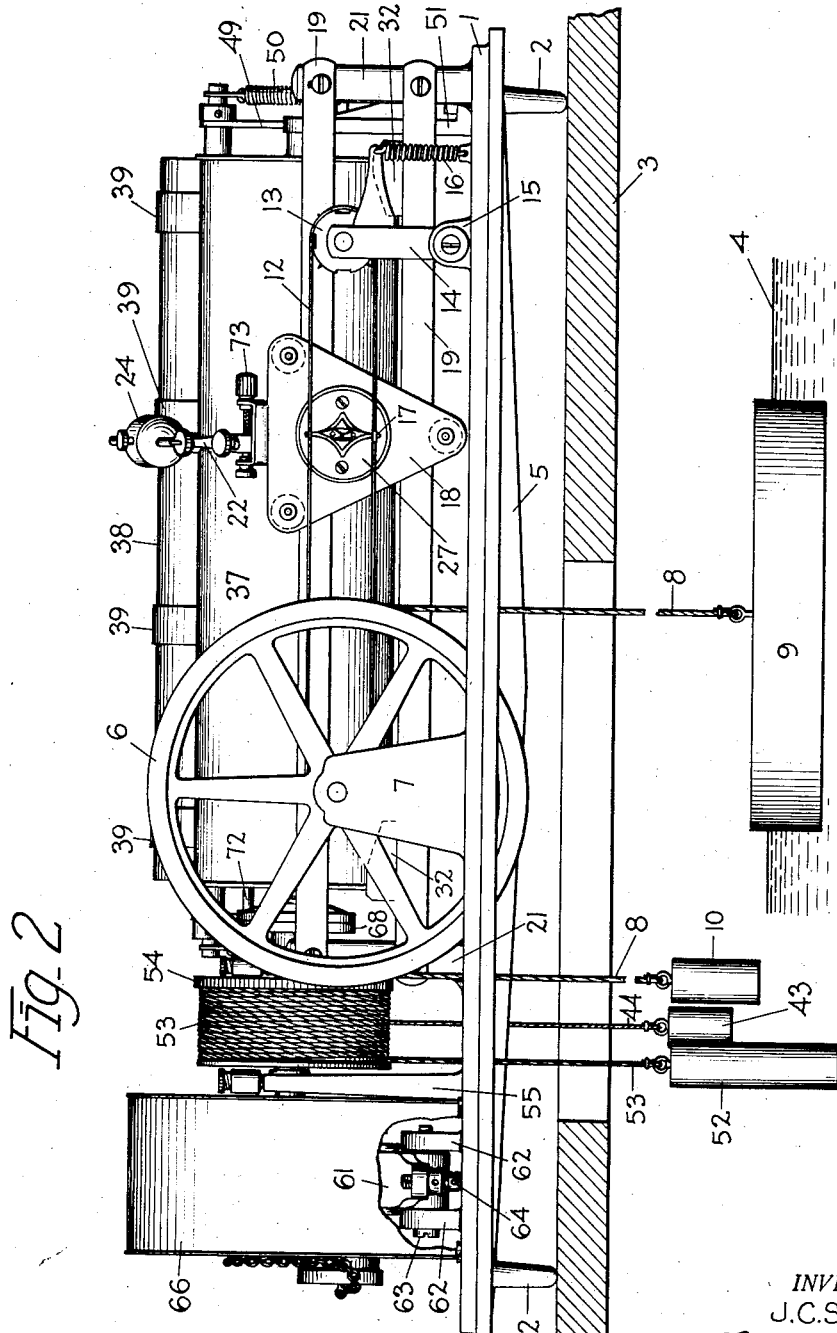
Fig. 2 is a front elevation of Fig. 1.

Referring to Fig. 2, the base plate 1 of the apparatus is provided with legs 2, and rests on the platform 3 over the water level 4. The underside of the base plate is reinforced with stiffening ribs 5. On top of the base plate is a sheave 6 supported in bearings 7. Over the sheave leads a cable 8 with a float 9 at one end and a counter weight 10 at the other. The rotation of the sheave, occasioned by the rise and fall of the float, is transmitted to the spine pulley 11 (Fig. 1) at the end of the sheave shaft since both, sheave and pulley, are firmly affixed to said shaft. A perforated metal ribbon, constituting an endless belt 12, is driven by the spine pulley 11. The other end of the belt is supported by the spine pulley 13. The spine pulleys derive their names from short spines on the rim, which engage the perforations in the belt to exclude slipping and lost motion.

An important feature in connection with the spine pulley 13 is the manner of its support. The rigid support formerly used caused the belt to buckle under expansion and thereby entailed inaccurate records; while excessive tension under contraction broke the belt very quickly; also the replacing of a belt required a certain amount of mechanical skill. All these disadvantages are avoided in the present construction. A bell crank 14 is pivoted in the bearings 15 on the base plate 1, the spine pulley 13 is mounted at the upper end of the vertical arm, and a tension spring 16 is fixed between the end of the horizontal arm and the base plate 1. Thus a uniform tension in the belt 12 is maintained, and replacement of a broken belt is easily effected by inclining the vertical arm toward the left and slipping the new belt over the spine pulleys.

A pin 17 on the belt projects into suitable slots in the recording carriage and draws the latter back and forth. This recording carriage is composed of a triangular plate 18, held on the rails 19 by the wheels 20. It should be noted that the rims on the upper wheels are not flanged as shown on the lower wheel, but are provided with V-shaped grooves; this construction eliminates all possibility of lost motion in a direction crosswise to the rails just where such lost motion would be least desirable. The pillars 21 serve for the support of the rails 19. Hingedly secured to the upper edge of the triangular plate is a pencil holding arm 22 with a pencil 23 and a weight 24 (see Figs. 5 and 6). Firmly attached to the front of the triangular plate, by means of the screws 25, is a disk 27 which contains the previously mentioned slots for the pin 17. These slots, being composed of cycloidal curves and connected with each other, not only define the outlines of a cam, but to a certain extent perform the function of one and may therefore be grouped together under the term cycloidal cam 27.

The cycloidal curves on the cam enable the recording carriage to maintain a uniform rate of motion to the very end of its travel, although the pin, in traveling around the spine pulley as shown in Figs. 8 and 9, is compelled to change from a linear to a circular motion.

Furthermore, the configuration of the cam, with its opposing corners being held symmetrically, makes it entirely immaterial whether the pin happens to be on the upper or lower run of the belt.

Another advantage of this construction is that the scale of the record remains the same, no matter how great the variation in water levels may be.

Yet another advantage is that the record is not limited to the distance from one spine pulley to the other, but that a rise or fall of practically unlimited magnitude can be recorded. Such a continuous rise or fall being registered when the pin continues to go round in one direction. True, the pencil carriage, and therewith the pencil, will reverse its path of travel as the pin swings around the pulley, but that seeming contradiction disappears when the record is read correctly, as will be explained hereinafter.

Without some positive guiding means the pin, in changing from a linear to a circular motion, would be apt to catch at the highest or lowest peak of the cycloidal cam, or even to switch into the wrong track, this is avoided by the employment of the switches 28. The latter are pivoted at 29 in the cycloidal cam, and actuated by a pin 30 which forms a part of the T-shaped lever 31 at the back of the triangular plate 18 (Fig. 7). As the recording carriage arrives near the end of the travel one arm of the T-shaped lever is lifted by the switch plate 32 on the rail 19. This throws the switches 28 so that the wrong track is closed and no obstruction in the proper track is encountered. At the other end of the track the switches are reversed in a similar manner.

Figure 3:
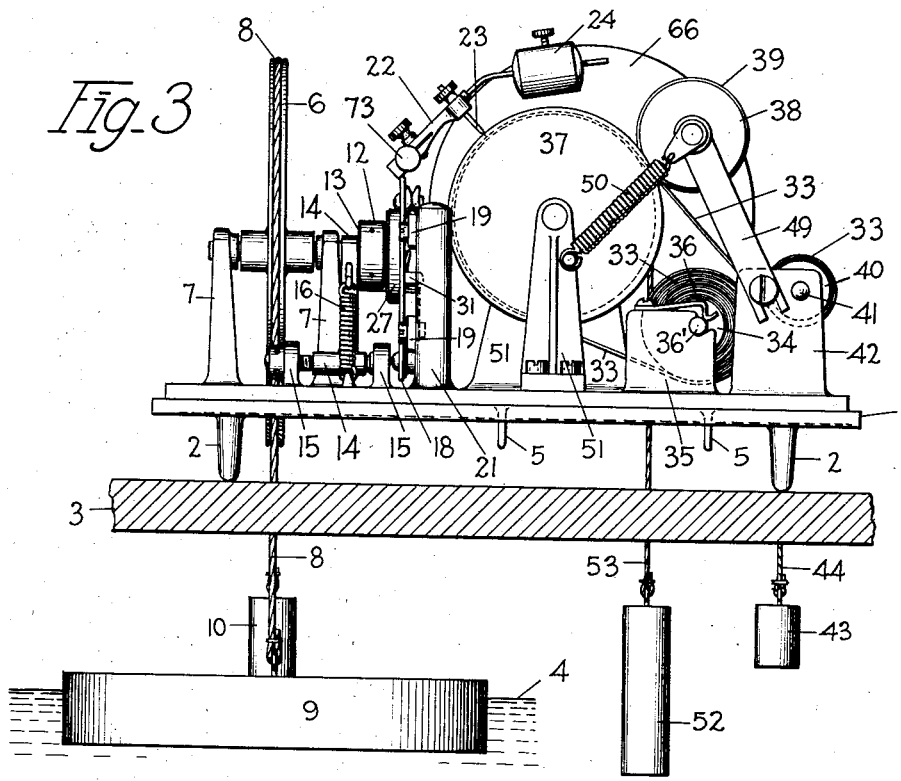
Fig. 3 is an end elevation of Fig. 1.

The recording paper 33 is a strip about eleven inches wide and twenty-five feet long, and wound on the supply roller 34 (Fig. 3). This supply roller is mounted in bearings 35; the leaf springs 36 on top of the bearings act as brakes on the shaft 36' of the supply roller and prevent the accidental unrolling of the recording paper. From the supply roller the recording paper is led over the recording drum 37, under an idle roller 38 encircled with rubber bands 39, and thence onto the take-up roller 40 which latter is resting with its shaft 41 in the bearings 42. The take-up roller is rotated by a weight 43 and cable 44 on the spool 45 (Fig. 1). To enable a rewinding of the cable on the spool without removing the paper, said spool has at one end the ratchet teeth 46 which engage a pin 47 in the shaft of the take-up roller. A compression spring 48 at the other end of the spool prevents the ratchet teeth from accidental disengagement.

One feature in connection with the take-up roller 40 deserves special mention. There is apt to be an uneven tension in the sides of the recording paper, if this were not taken care of in some manner, the paper would wrinkle on the take-up roller and even be thrown out of alinement on the recording drum. For this reason the bearings 42 are set far enough apart and the shaft 41 is made long enough, so that the take-up roller can slide in axial direction and adjust itself automatically to any uneven tension in the sides of the paper.

The idle roller 38 is held in slotted arms 49 on the bearings 42; the tension springs 50 between the idle roller and the bearings 51 press the idle roller against the recording drum. The recording paper being thus held tightly against the circumference of the drum, both must necessarily travel with the same circumferential velocity.

The desired rotation in the recording drum 37 is produced by means of a weight 52 at the end of a cable 53 on the cable drum 54. The latter is supported in the bearings 51 and 55 by the shaft 56 (Fig. 10). A spring pawl 57 (Fig. 12) in the cable drum engages the ratchet wheel 58 on the shaft 56 and rotates both cable drum and shaft in unison. The function of the ratchet mechanism is to enable a rewinding of the cable drum when run down. Keyed to the end of the shaft 56 is a large gear 59, and this meshes with a pinion 60 on the regulating clock 61 (Fig. 11), so that the shaft 56 cannot rotate faster than the clock permits. A novel feature is the manner of attaching the clock in the bearings 62 by a single pin 63, which makes the replacement of a worn-out clock a very simple matter. The adjusting screws 64 in the base 65 of the clock permit a very accurate meshing of the pinion 60 with the gear 59.

It may be stated that the interior of the clock mechanism is protected by a strong and dust-proof casing, and over the entire clock is placed an extra shell 66 (Fig. 2) to keep the clock as safe from interference as possible.

In the end of the shaft 56 (Fig. 10), next to the recording drum 37, is a socket to receive the axial pivot 67 of the recording drum. The flexibility of this connection prevents the recording drum or the shaft from binding in their bearings in case the base plate 1 should warp or buckle under expansion and contraction. As a result the occasional stoppage of the clock is eliminated, and a weight of seven or eight pounds can now be used where formerly about forty pounds were required. Incident to the lighter weight the wear in the moving parts is considerably reduced, and the life of the machine greatly increased.

On the shaft 56 are the two clutch plates 68 and 69, the former being rigidly attached to the shaft, the latter pressed against the former by a dished spring 70 but otherwise free to rotate if sufficient external force is applied to overcome the spring-induced friction between the clutch plates. Abrasion under forcible rotation is prevented by grease in the annular chambers 71 in both clutch plates from whence sufficient grease finds its way to the face of the clutch plates.

Riveted into the clutch plate 69 is a carrier pin 72 which projects into a hole in the end wall of the recording drum 37 and carries the latter along. The advantage of this arrangement is first, that the rotation of the recording drum is not impeded by a slight buckling of the supporting base plate yet the recording drum can be turned by hand in order to bring a proper point of the recording paper under the recording pencil when the record is started; and second, that the elimination of set screws between the recording drum and the cable drum shaft eliminates the loss of a record in case the operator forgets to tighten the set screws.

The pin 72 has been slotted to work smoothly, and at the same time without lost motion, in the end wall of the recording drum.

The operation of the machine is as follows: The recording paper 33 from the supply roller 34 is drawn forward over the recording drum 37, below the idle roller 38 and onto the take-up roller 40; the weights 52 and 43 on the cable drum 54 and spool 45 respectively are wound up; the recording drum 37 is turned by hand until the pencil 23 indicates the proper time of day on the recording paper; the cable 8 is slackened in the sheave 6 and the latter turned until the pencil indicates the proper height of water level; slight discrepancies between the water level as actually observed and the position of the pencil on the recording paper can be adjusted by turning the adjusting screw 73 on the pencil carriage; thenceforth no further attention need be bestowed on the apparatus until the paper on the supply roller has been exhausted or the weights on the cable drum need winding.

Figure 4:
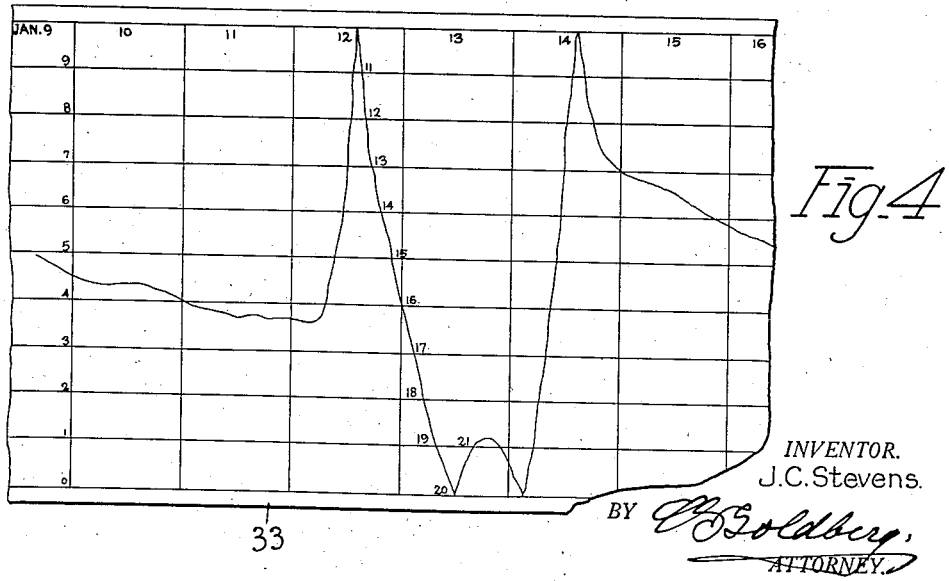
Fig. 4 is a portion of the recording paper, illustrating the path of the recording pencil.

Fig. 4 shows a sample strip of the recording paper with the cross lines for height of water levels and for the dates. The path of the pencil indicates that the record was started on Jan. 9th at a five-foot height of water level. The latter gradually fell until on Jan. 12th it arrived below four feet, when a sudden swell occurred which carried the pencil to the upper edge of the record (which on this machine would be located on the right-hand side). Thereupon the pencil went back to the lower edge, arriving there on Jan. 13th, from there went up again but after traversing a little more than one space, returned to the lower edge, then traveled to the upper edge, arriving there on Jan. 14th and gradually returned toward normal. The question is which one of these zigzag curves are to be interpreted as "rise" and which as "fall"?

First of all, abnormal conditions in the water levels are matters of public observations and record, so that the experienced reader is prepared to look for a rise or fall, as the case may be. In addition thereto he observes that the node of Jan. 12th is opposed by one on Jan. 14th, and further that the node of Jan. 13th on the lower edge of the record is opposed by a node on the same edge on Jan. 14th. This teaches him that the curve from Jan. 12th to Jan. 13th represents an additional rise of ten feet, this rise even continuing for one space farther on the 13th of January, giving a total rise to a stage of more than twenty one feet. From then on the fall began and continued until normal was reached again.

From the foregoing specification it will be perceived that my objects have been accomplished. Where a former construction has been referred to, I have held in mind chiefly a patent issued to me on December 7, 1915, under Number 1,163,279, and title Water stage recorder. It may further be stated that this apparatus is mainly used for the recording of water levels, but that the levels of oil or in fact of any other kind of liquid can be recorded with equal facility, and that therefore a deviation to such uses may be considered to fall within the purview of my invention.

I claim:

1. In a water level recorder, the combination of a float, a spine pulley rotated by the float, rigid bearings to support the spine pulley, a perforated metal belt driven by the spine pulley, and means to support the other end of the belt yieldingly.

2. In a water level recorder, the combination of a base plate, a float-operated spine pulley supported in rigid bearings on the base plate, an endless belt driven by the spine pulley, a bell crank mounted on the base plate in spaced relation to the rigidly supported spine pulley, a spine pulley mounted on the bell crank to support the other end of the belt, and a tension spring between bell crank and base plate.

3. In a water level recorder, the combination of a rigidly supported spine pulley rotated by a float, a yieldingly supported spine pulley in spaced relation to the first-named spine pulley, an endless belt around both spine pulleys, and a pencil carriage operated by the belt.

4. In a water level recorder, the combination of a float-operated belt, a recording carriage adjacent to the belt, a cycloidal cam in the recording carriage, and a pin projecting from the belt into the cycloidal cam, whereby the recording carriage receives a uniform rate of motion to the end of the travel.

5. In a water level recorder, the combination of a float-operated belt, a recording carriage actuated by the belt, said recording carriage comprising a vertical plate, wheels at the upper edge of the plate, said wheels having V-shaped grooves in the circumference, a flanged wheel at the bottom edge of the plate, and two rails mounted one above the other, the upper rail carrying the grooved wheels, the lower rail guiding the flanged wheel.

6. In a water level recorder, the combination of a float-operated belt, a recording carriage adjacent to the belt, a cycloidal cam in the recording carriage, a pin projecting from the belt into the cycloidal cam, and means to positively guide the pin in said cycloidal cam.

7. In a water level recorder, the combination of a float-operated belt, a recording carriage adjacent to the belt, a cycloidal cam in the recording carriage, a pin projecting from the belt into the cycloidal cam, and switches in the cycloidal cam to guide the movement of the pin.

8. In a water level recorder, the combination of a clock-operated recording paper, with recording means including a recording carriage, a cycloidal cam attached to the carriage, switches pivotally mounted within the cycloidal cam, and means to automatically actuate the switches by the motion of the recording carriage.

9. In a water level recorder, the combination of a clock-operated recording paper, with a recording carriage, a cycloidal cam attached to the front of the recording carriage, switches pivotally mounted within the cycloidal cam, and a T-shaped lever attached to the rear of the recording carriage, the horizontal arms of the T-shaped lever being actuated by the motion of the recording carriage to throw the switches in the cycloidal cam.

10. In a water level recorder, the combination of a track, a recording carriage movable on the track, a cycloidal cam in the recording carriage, switches in the cycloidal cam, a T-shaped lever to operate the switches, and a switch plate at each end of the track to actuate the T-shaped lever.

11. In a water level recorder, the combination of a float, a recording carriage cooperatively connected with the float, a cycloidal cam in the recording carriage, switches in the cycloidal cam, a track supporting the recording carriage, a clock-operated recording paper extending in width from one track to the other, and means to throw the switches when the recording carriage arrives at the edge of the recording paper.

12. In a water level recorder, the combination of a float-operated recording pencil, a clock-operated recording drum, a strip of recording paper passing over the recording drum, and a take-up roller for the recording paper, said take-up roller having a sliding motion in axial direction to adjust itself to uneven tension in the edges of the recording paper.

13. In a water level recorder, the combination of a float-operated recording pencil, a clock-operated recording drum, a recording paper passing over the recording drum, a take-up roller mounted parallel to the recording drum, a shaft rigidly secured in the take-up roller, and bearings for the shaft, the distance between the bearings exceeding substantially the length of the take-up roller.

14. In a water level recorder, the combination of a float-operated pencil, a recording paper, and means to carry the paper past the pencil, said means including a recording drum, a clock to control the movement of the recording drum, and means to adjust the position of the clock in relation to the recording drum.

15. In a water level recorder, the combination of a float-operated pencil, a recording paper, a recording drum supporting the paper under the pencil, a rotating cable drum actuating the recording drum, and a clock regulating the rotation of the cable drum, said clock being pivotally mounted at the base in the center and having adjusting screws in the base at both sides of the center pivot.

16. In a water level recorder, the combination of a cable drum, a shaft extending axially through the cable drum, ratchet mechanism between the cable drum and shaft, a gear firmly attached to the end of the shaft, a regulating clock adjacent to the shaft, a pinion connected integrally with the recording clock and meshing with said gear, and a recording drum flexibly connected with the other end of the shaft.

17. In a water level recorder, the combination of a rotating cable drum, a shaft in the cable drum, a clutch plate rigidly attached to the end of the shaft, a clutch plate rotatably mounted on the shaft and held by friction to the first-named clutch plate, and a recording drum flexibly supported in the end of the shaft and also flexibly connected to the rotatably mounted clutch plate.

18. In a water level recorder, the combination of a rotating cable drum shaft, a socket in the end of the shaft, a recording drum with one end pivotally mounted in the socket, said recording drum having a hole in the end wall adjacent to the pivot, a friction clutch on the shaft, a split carrier pin extending from the friction clutch into the recording drum, said pin engaging the hole in the end wall slidingly and rotating the recording drum in unison with the cable drum shaft.

19. In a water level recorder, the combination of a cable drum shaft, two clutch plates secured on the shaft, said clutch plates being mounted for frictional engagement relative to each other, and an annular grease chamber in each clutch plate, both grease chambers being located closely to the shaft, and registering with each other.

Signed by me at Portland, Oregon, this 3rd day of April, 1922.

J. C. STEVENS.